US010531677B2

(12) United States Patent
Bendixen et al.

(10) Patent No.: US 10,531,677 B2
(45) Date of Patent: Jan. 14, 2020

(54) ICE CREAM MACHINE AND A METHOD FOR PRODUCING AN ICE CREAM PRODUCT USING AN ICE CREAM MACHINE

(71) Applicant: Tetra Laval Holdings & Finance S.A., Pully (CH)

(72) Inventors: Ole Bendixen, Galten (DK); Tommy Bonde, Silkeborg (DK)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/305,843

(22) PCT Filed: May 29, 2017

(86) PCT No.: PCT/EP2017/062833
§ 371 (c)(1),
(2) Date: Nov. 29, 2018

(87) PCT Pub. No.: WO2017/207457
PCT Pub. Date: Dec. 7, 2017

(65) Prior Publication Data
US 2019/0335787 A1    Nov. 7, 2019

(30) Foreign Application Priority Data
May 30, 2016   (EP) ..................... 16171858

(51) Int. Cl.
*A23G 9/26*     (2006.01)
*A23G 9/22*     (2006.01)
(Continued)

(52) U.S. Cl.
CPC ........... *A23G 9/265* (2013.01); *A23G 3/0055* (2013.01); *A23G 3/125* (2013.01); *A23G 7/0031* (2013.01);
(Continued)

(58) Field of Classification Search
CPC .......... A23P 10/10; A23P 30/10; A23G 3/125; A23G 3/0055; A23G 3/563; A23G 1/505;
(Continued)

(56) References Cited

U.S. PATENT DOCUMENTS 1,487,788 A * 3/1924 Lombardo ........... A23G 3/0236
425/116
1,635,682 A * 7/1927 Marr ..................... A23G 3/0236
426/421
(Continued)

FOREIGN PATENT DOCUMENTS

GB            2043023       10/1980

OTHER PUBLICATIONS

Extended Search Report for European Application No. 16171858.0 dated Sep. 26, 2016 in 7 pages.
(Continued)

*Primary Examiner* — Drew E Becker
(74) *Attorney, Agent, or Firm* — Knobbe, Martens, Olson & Bear LLP

(57) ABSTRACT

The present disclosure relates to an ice cream machine having a filling zone and an emptying zone. The ice cream machine may include a rotatable unit, a mould for receiving ice cream, a stick providing arrangement, and a guiding structure arranged to prevent more than one stick from entering the groove of the mould from the stick providing arrangement. The stick providing arrangement is arranged such that a rotation of the rotatable unit causes the groove to match the position of the stick providing arrangement and thereby allow a single stick to enter the groove, wherein further rotation of the rotatable unit causes one of the sidewalls of the groove to bring the stick along the rotational movement of the rotatable unit.

8 Claims, 5 Drawing Sheets

(51) Int. Cl.
| | |
|---|---|
| *A23G 9/50* | (2006.01) |
| *A23P 10/10* | (2016.01) |
| *A23G 3/12* | (2006.01) |
| *A23G 7/00* | (2006.01) |
| *A23G 3/34* | (2006.01) |
| *A23P 30/10* | (2016.01) |

(52) U.S. Cl.
CPC ............ *A23G 7/0081* (2013.01); *A23G 9/221* (2013.01); *A23G 9/503* (2013.01); *A23P 10/10* (2016.08); *A23P 30/10* (2016.08)

(58) Field of Classification Search
CPC ................ A23G 7/0031; A23G 7/0081; A23G 9/26–9/265; A23G 9/503; A23G 2220/12
USPC ......... 426/91, 101, 110, 134, 512, 515, 524; 425/126.2
See application file for complete search history.

(56) References Cited

U.S. PATENT DOCUMENTS

| | | | | |
|---|---|---|---|---|
| 2,274,664 | A | * | 3/1942 | Cahoon ................ A23G 3/0289 425/115 |
| 2,660,963 | A | * | 12/1953 | Covert ................ A23G 3/0289 425/116 |
| 3,554,138 | A | * | 1/1971 | Glass ..................... A23G 9/265 425/114 |
| 3,879,162 | A | | 4/1975 | Aquarius |
| 4,130,936 | A | * | 12/1978 | Cottrell ................ A23G 9/265 29/798 |
| 4,208,437 | A | * | 6/1980 | Derckx ................ A23G 3/0289 426/134 |
| 2005/0079246 | A1 | | 4/2005 | Asma et al. |
| 2018/0139984 | A1 | * | 5/2018 | Skoglund ................ A23G 9/22 |

OTHER PUBLICATIONS

International Search Report and Written Opinion for Application No. PCT/EP2017/062833 dated Jul. 6, 2017 in 8 pages.

* cited by examiner

ICE CREAM MACHINE AND A METHOD FOR PRODUCING AN ICE CREAM PRODUCT USING AN ICE CREAM MACHINE

TECHNICAL FIELD

The present invention relates to an ice cream machine, and a method for producing an ice cream product using an ice cream machine.

BACKGROUND ART

In the ice cream producing industry ice cream, or an ice cream mixture, is used to produce ice cream products. In the process, the ice cream is extruded through an extrusion nozzle and subsequently cut into ice cream products by means of a cutting tool. The cutting tool may e.g. be a knife or a scrape. Additionally, an ice cream stick is inserted into the ice cream to produce so called ice cream lollies. Thereafter, the ice cream products can be put on a conveyer tray or conveyer belt for further transportation to e.g. packaging and storing.

Some ice creams comprise inclusions or particles. These inclusions may cause a problem for the positioning of the stick in the ice cream as the inclusions may be located in a portion of the ice cream where the stick is to be inserted. Thus, the inclusions may cause a misplacement of the stick in the ice cream. Further, the inclusion may cause unacceptable shapes due to holes and protrusion caused by the inserted stick moving the inclusion(s). Even if no inclusions are present in the ice cream mixture, a stick inserter arranged to inset the stick into the ice cream, may cause the sticks to be offset compared to its intentional position in the ice cream product. This may in turn cause the ice cream products to be misplaced on the conveyer tray.

There is thus a need for improving the state of the art to provide for an ice cream machine which at least partly solves these problems.

SUMMARY

It is an object to improve the current state of the art, to solve the above problems, and to provide an improved ice cream machine. These and other objects are achieved by an ice cream machine having a filling zone and an emptying zone, and a method for producing an ice cream product using an ice cream machine.

According to a first aspect an ice cream machine having a filling zone and an emptying zone is provided. The ice cream machine comprises:

a rotatable unit having a radial extension and a rotational axis;

a mould for receiving ice cream, the mould being arranged to rotate with the rotatable unit, the mould comprising a groove for receiving a stick, the groove having two sidewalls and a bottom;

a stick providing arrangement for supplying a stick to the groove of the mould, the stick providing arrangement being configured to supply a stick perpendicular to the rotational axis of the rotatable unit, and wherein the longitudinal direction of the stick is arranged parallel to the rotational axis of the rotatable unit;

a guiding structure arranged to prevent more than one stick at a time from entering the groove of the mould from the stick providing arrangement;

wherein the stick providing arrangement is arranged such that upon rotation of the rotatable unit the groove matches the position of the stick providing arrangement to enable a single stick to enter the groove, wherein further rotation of the rotatable unit causes one of the sidewalls of the groove to bring the stick along the rotational movement.

The present ice cream machine utilizes that the stick can be arranged in the correct position prior to filling the mould with ice cream, even with large inclusions in the ice cream. The ice cream may thus be filled in the mould around the stick, and possible inclusions may therefore adapt their locations within mould in such a way that the risk of having a misplaced stick is reduced. Further, the present ice cream machine provides the potential of higher capacity, i.e. more ice cream product per unit of time, compared to the state of the art. In particular, the groove, the stick providing arrangement and guiding structure cooperate to enable a large number of sticks to be inserted into a mould (or into a plurality of moulds) per unit of time. Another advantage is that there is a reduced risk for forming holes or protrusion, by moving inclusions, as the stick is inserted prior to filling of the mould with ice cream. Furthermore, by using a rotatable unit, the ice cream machine can be made more compact.

It should be noted that the rotatable unit may preferably have a curved cross section. According to at least one example embodiment, the cross section is circular and the rotatable unit is formed as a rotatable wheel or as a rotatable cylinder, such as e.g. an open cylinder. According to at least one example embodiment, the cross section may have an oval shape.

In the embodiment where the rotatable unit is formed as a rotatable wheel or cylinder, the mould is preferably arranged as an indention in an outer wall of the wheel or cylinder. Here, the radial extension of the rotatable unit is comparable with an extension in the radial direction of the wheel or cylinder.

The stick or sticks mentioned herein may be flat and elongated. The sticks may be made of wood, plastics or other suitable materials.

The stick providing arrangement is preferably arranged such that sticks enter the groove due to the force of gravity. The stick providing arrangement may alternatively be known as a stick magazine, or a stick loading module. Thus, it is understood that, during operation of the ice cream machine, a plurality of sticks are held within the stick providing arrangement.

In at least one exemplary embodiment, the guiding structure comprises a slit which is sloping radially inwards in the rotational direction of the rotatable unit such that the stick reaches the bottom of the groove. Stated differently, the guiding structure comprises a slit which is sloping radially inwards in the rotational direction of the rotatable unit, at the end of the rail the height of the rail measured in radial direction is the same as the bottom of the groove such that a stick, after the rail end of the slit, is supported by the bottom of the groove.

In at least one exemplary embodiment, the stick providing arrangement is arranged to provide the stick in the final longitudinal direction, along the rotational axis, for the ice cream product to be produced. This means that there is no need for further manipulation, at least in a longitudinal direction, of the stick downstream of the stick providing arrangement.

In at least one exemplary embodiment, the stick providing arrangement and the guiding structure are arranged upstream of the filling zone of the ice cream machine. In at least one exemplary embodiment, the stick providing arrangement and the guiding structure are arranged upstream of the filling zone and downstream of the emptying zone. Stated differently, the stick providing arrangement and the guiding structure are arranged between the emptying zone and the filling zone, and are thus arranged to provide a stick while the mould is empty. Hence, the stick providing arrangement and the guiding structure may be arranged in a stick providing zone downstream of the emptying zone and upstream of the filling zone of the ice cream machine.

In at least one exemplary embodiment, the stick providing arrangement is configured to hold a plurality of sticks stacked with a flat surface of the sticks facing each other, and further to supply a stick with the flat side facing the rotational axis of the rotatable unit.

In at least one exemplary embodiment, the ice cream machine further comprises:

an extrusion nozzle for extruding ice cream into the mould, the extrusion nozzle being arranged at the filling zone;

an ejection mechanism for ejecting ice cream radially out of the mould at the emptying zone.

By radially ejecting said ice cream, or ice cream product, out of said mould by an ejection mechanism, said ice cream, or ice cream product, may easily be detached from said mould and thereafter e.g. be put on a conveyer belt. With such an arrangement, the ice creams or ice cream products can be put on a possible conveyer tray in a repeatable manner with fewer misplaced ice cream products. Furthermore, the ice cream products can be put directly, or essentially directly, onto the conveyer belt as they are ejected radially. Thus, undesirable and uncontrollable falling or dropping of the ice cream products before reaching the conveyer tray may be reduced or even avoided.

In at least one exemplary embodiment, the ice cream machine comprises at least five moulds. Each mould comprises a groove for receiving a stick, the groove having two sidewalls and a bottom. Depending on the size of the mould, the number of moulds is often maximized on the outer surface of the rotatable unit.

The ejection mechanism may comprise a piston connected to the mould. The piston may be movable in the radial direction. Hereby, the piston may push the mould, or at least a part of the mould, in the radial direction.

According to at least one example embodiment, a bottom of the mould is movable. For example, the bottom of the mould may be radially movable together with the piston. In this embodiment, lateral walls of the mould may e.g. comprised in a body of the rotatable unit, while the bottom of the mould is arranged to be movable within the body of the rotatable unit. The bottom may e.g. be arranged to be radially movable in such a way that the bottom can be moved from inside the body of the rotatable unit up to at least the circumference or periphery of the rotatable unit. In other words, in a first state, the mould is formed as an indention in the rotatable unit where the bottom of the mould is located inside the rotatable unit (e.g. when the mould is to be filled with ice cream at the filling zone), and in a second state, where the bottom of the mould has been moved closer to the circumference or periphery of the rotatable unit (i.e. closer to the outer wall of the rotatable unit) such that the indentions is smaller, or no longer present (e.g. when ejecting the ice cream from the mould at the emptying zone).

Hereby, the piston may push the bottom of the mould in a radial direction whereby the ice cream, or ice cream product, is ejected from the mould.

According to at least one example embodiment, the bottom of the mould is not movable, and the piston is arranged to move radially within the mould to push the ice cream, or ice cream product, in order to ejected it from the mould.

The ice cream machine may comprise a transporting zone between the filling zone and the emptying zone, wherein at the transporting zone the ejection mechanism is arranged to move the mould, or at least a bottom of the mould, radially inwards of the rotatable unit.

According to at least one example embodiment, further expansion of ice cream into the mould is prevented by arranging the ejection mechanism to move the mould, or at least a bottom of the mould, radially inwards at the later stage of the filling zone. In other words, when the mould has been filled with ice cream, an increase of the pressure inside the mould is prevented by already at the filling zone arranging the mould, or at least the bottom of the mould, to move radially inwards.

Hereby, the pressure inside the mould may be adjusted. For example, in the process of filling the mould with ice cream through the extrusion nozzle, an increase pressure (or overpressure) is often used. This overpressure may remain in the mould as the mould is typically covered from the surroundings until it reaches the emptying zone, i.e. until the ice cream, or ice cream product, is to be ejected from the mould. Here, the ice cream, or ice cream product, may be undesirably deformed due to the sudden release of the pressure in the mould. Thus, by moving the mould, or at least the bottom of the mould, radially inwards, the overpressure can be reduced in a controllable manner e.g. during the transportation of the mould between the filling zone and the emptying zone, and undesirably deformation of the ice cream product can be reduced.

Thus, by moving the mould, or at least a bottom of the mould, radially inwards after filling the mould with ice cream, the pressure inside the mould may be equalized before the mould is exposed to the surroundings, and the ice cream product is ejected out of the mould. Otherwise, the pressure will be equalized at the moment the mould exposes the ice cream mixture therein to the surroundings. In that case, an undesired bulb may be formed on the ice cream product. The amount of which the mould, or at least a bottom of the mould, is moved radially inwards is dependent on e.g. the pressure used during filling of the mould and the air content (so called "overrun") in the ice cream. Furthermore, there can be some fluctuation in the supplying flow of ice cream to the mould, and hence the pressure of which the moulds are filled. For example, if the ice cream has 100% overrun, and the filling bar is 0.5 bar, the mould, or at least the bottom of the mould, should be moved approximately inwards of about ⅛ of the final depth of the mould. For example, if the final depth of the mould is 24 mm, the mould, or at least the bottom of the mould, should be moved radially inwards approximately 3 mm. Thus, in this example, the mould has a depth of 21 mm during filling of the mould with ice cream. For a higher filling pressure, the mould, or at least the bottom of the mould, may have to be moved even further radially inwards.

According to at least one example embodiment, the mould, or at least the bottom of the mould is arranged to be moved radially inwards of between 0% and 20% as compared to the final depth of the mould. According to at least one example embodiment, the mould, or the bottom of the mould is arranged to be moved radially inwards of between 1 mm and 10 mm, such as e.g. between 1 mm and 5 mm.

According to at least one example embodiment, the ejection mechanism is arranged to move the bottom of the mould radially inwards of the rotatable unit.

It should be noted that in the transportation zone, the moulds and the ice cream therein are transported by being rotated together with the rotating unit. Hence, the transportation zone may be referred to as a rotating transportation zone.

The piston may be a reciprocal piston. For example, the piston may be reciprocal by being connected to a cam shaft arranged at a hub or a centre of the rotatable unit. According to at least one example embodiment, the piston is reciprocal by being pneumatic, hydraulic or electrically actuable.

By having a reciprocal piston, the piston may move in the radial direction, e.g. both inwardly and outwardly in the radial direction. The reciprocal piston may be referred to as a reciprocating piston. Thus, it should be understood that by being reciprocal or reciprocating, the piston may move back and forth, i.e. radially inwardly and outwardly, for example by contracting and expanding, respectively.

The ice cream machine may comprise at least two moulds, wherein the extrusion nozzle is arranged to cover more than one mould at the filling zone. Hereby, at least two moulds may simultaneously be filled with ice cream by the extrusion nozzle. It should be noted that the extrusion nozzle need not to cover the whole of the two moulds, but it is sufficient that the extrusion nozzle is covering at least a portion of each of the two moulds in order to be able to fill them simultaneously.

According to at least one example embodiment, the ice cream machine may comprise at least three moulds, wherein the extrusion nozzle is arranged to cover more than two moulds at the filling zone.

According to at least one example embodiment, a plurality of moulds is evenly arranged along the circumference or periphery of the rotatable unit.

The ice cream machine may comprise a sealing arranged to seal the extrusion nozzle to the rotatable unit. This is especially advantageous when the mould is filled with ice cream by the extrusion nozzle using an overpressure, as no, or little, ice cream is then allowed to slip out of the ice cream machine on the sides of the rotatable unit. According to at least one example embodiment, the extrusion nozzle comprises a boundary edge facing at least a portion of the rotatable unit, wherein the sealing is arranged to seal the extrusion nozzle to the rotatable unit, at least along the boundary edge. The sealing may be attached to the rotatable unit, the extrusion nozzle or both. The sealing may e.g. be a rubber sealing or a silicone sealing.

The ice cream machine may comprise a detaching mechanism arranged to detach the ice cream from the mould at the emptying zone, wherein the detaching mechanism is at least one of the following: a scrape, a wire, a pneumatic-driven system, an ultrasound cutting tool.

Thus, when the ejection mechanism has pushed the ice cream, or ice cream product, out of the mould at the emptying zone, the ice cream, or ice cream product is typically attached to the bottom of the mould (now e.g. being a part of the circumferential or periphery of the rotatable unit, i.e. the outer wall of the rotatable unit). Thus, the detaching mechanism may cut or push at a portion of the ice cream, or ice cream product, in such a way that it is detached from the bottom of the mould.

The pneumatic-driven system may e.g. be an air blow system which blows air through holes or apertures in the bottom of the mould. Thus, the ice cream, or ice cream product, can be detached from the bottom of the mould by the force or pressure supplied to by the air. The air may e.g. be provided to the mould through the piston. In this embodiment, the bottom of the mould need not to be movable.

The ice cream machine may comprise a conveyer tray arranged to receive the ice cream, or ice cream products, from the mould at the emptying zone, wherein the rotational speed of the rotatable unit is adapted to the speed of the conveyer belt.

The speed of the conveyer belt may e.g. be the same as the rotational speed of the rotatable unit. Hereby, the ice cream, or ice cream products, may be put on the conveyer belt in repeatable manner.

According to at least one example embodiment, the rotatable unit is connected to a motor for rotating the rotatable unit. The motor may e.g. be connected to the rotatable unit at a hub of the rotatable unit.

According to at least a second aspect a method for producing an ice cream machine is provided, the ice cream machine having an extrusion nozzle, an ejection mechanism, a rotatable unit, at least one mould arranged to rotate with the rotatable unit, the mould comprising a groove for receiving a stick, the groove having two sidewalls and a bottom, a stick providing arrangement for supplying a stick to the groove of the mould, the stick providing arrangement being configured to supply a stick perpendicular to the rotational axis of the rotatable unit and the longitudinal direction of the stick parallel to the rotational axis of the rotatable unit, and a guiding structure arranged to prevent more than one stick from entering the groove of the mould from the stick providing arrangement. The method comprises the steps of:

providing ice cream with or without inclusions;

providing ice cream sticks in the stick providing arrangement;

rotating the rotatable unit, whereby the groove matches the position of the stick providing arrangement such that a single stick enters the groove;

rotating the rotatable unit such that one of the sidewalls of the groove brings the stick along the rotational movement towards the filling zone;

extruding the ice cream through the extrusion nozzle into the mould to form an ice cream lolly; and ejecting the ice cream lolly out of the mould using the ejection mechanism.

Effects and features of the method are largely analogous to those described above in connection with the ice cream machine. Embodiments mentioned in relation to the ice cream machine may be implemented in the method as well.

For example, according to at least one example embodiment, the step of ejecting the ice cream comprises using a piston to push the ice cream out of the mould in a radial direction of the rotatable unit.

According to at least one example embodiment, the ice cream machine comprises at least two moulds, and wherein the step of extruding the ice cream comprises extruding ice cream into more than one mould simultaneously.

According to at least one example embodiment, the ice cream machine is heated or cooled by some sort of heating and/or cooling means, in order for the ice cream machine to maintain a temperature suitable for the process. According to at least one example embodiment, the temperature of the ice cream machine is held at approximately 0 degrees Celsius.

It should be noted that throughout the application, the radial direction is referring to a direction substantially following the radial extension of the rotatable unit, or in a direction being substantially parallel to the radial extension of the rotatable unit. An inwardly radial direction (or a direction radially inwards) is indicating a direction from the mould towards a hub or centre of the rotatable unit, while an outwardly radial direction (or a direction radially outwards) is indicating a direction from the hub or centre of the rotatable unit towards the mould. The direction in which the ice cream, or ice cream product, is ejected from the mould need not to be entirely radial, but the ice cream, or ice cream product may be ejected out of the mould in a direction having an axial component as well. However, according to at least one example embodiment, the direction in which the ice cream, or ice cream product, is ejected from the mould is entirely radial.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

In the present detailed description, embodiments of a ice cream machine are discussed. It should be noted that this by no means limits the scope of the invention, which is also applicable in other circumstances for instance with other types or variants of ice cream machines than the ones shown in the appended drawings. Further, that specific components are mentioned in connection to an embodiment of the invention does not mean that those components cannot be used to an advantage together with other embodiments of the invention.

In general, the present invention relates to rotary ice cream machine where ice cream lollies are formed in moulds being attached to the rotatable unit as the rotatable unit rotates. A stick is provided in the mould in a stick providing zone prior to a filling zone. The ice cream, with or without inclusions, are extruded into the moulds in the filling zone, and the ice cream lolly is ejected to a conveyer or other transportation or packaging means at an ejection zone.

Figure 1:
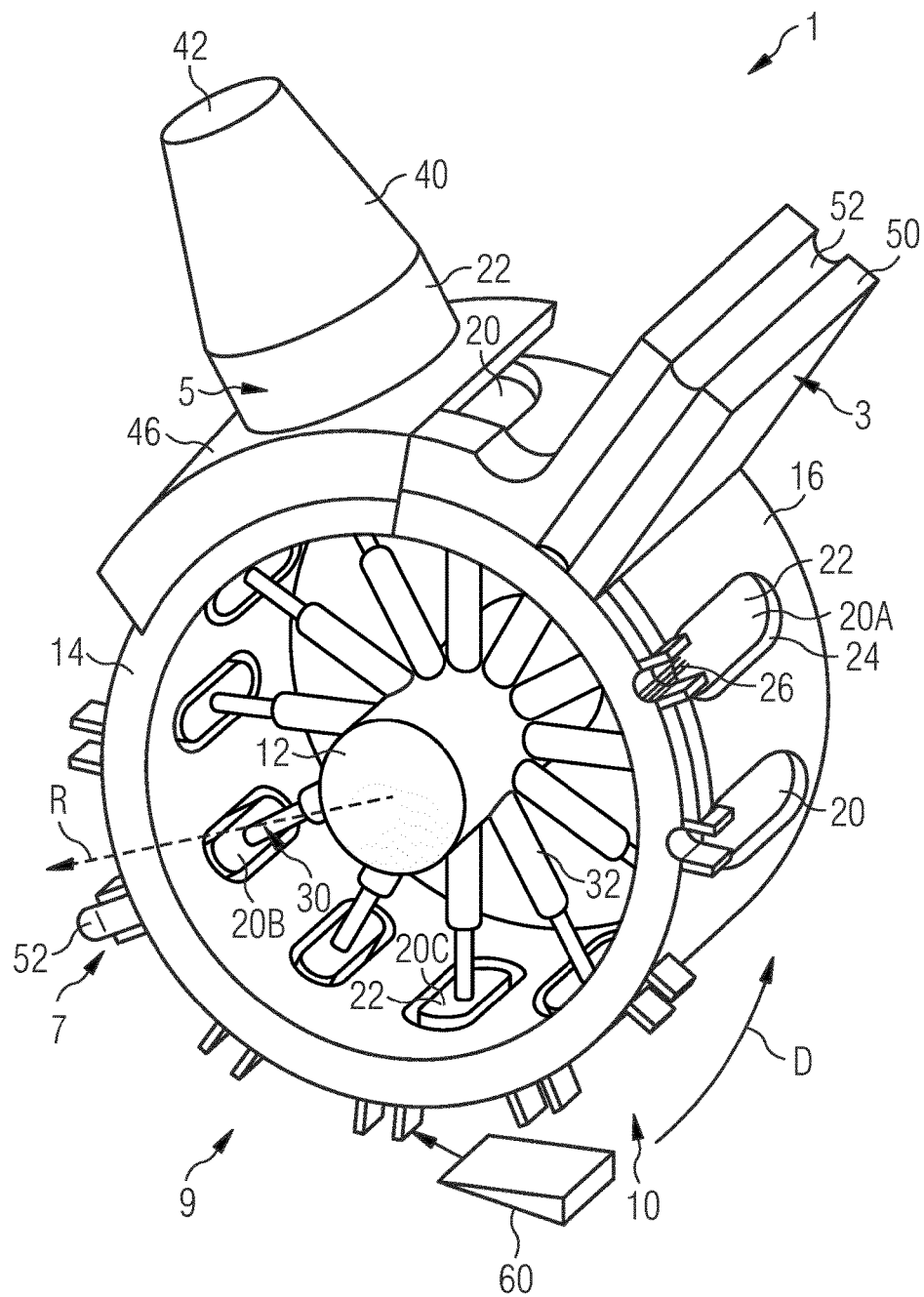
FIG. 1 is a perspective view of an ice cream machine according to an embodiment of the invention.

FIG. 1 shows an exemplary ice cream machine 1. The ice cream machine 1 comprises a rotatable unit 10, a plurality of moulds 20 (of which only some are indicated) each mould 20 being provided with an ejection mechanism 30. The ice cream machine 1 further comprises an extrusion nozzle 40, a stick providing arrangement 50 and a guiding structure 80 (shown in FIGS. 4-7).

The rotatable unit 10 of FIG. 1 is arranged as a rotatable wheel 10 having a hub 12 and a rotatable unit body 14. The rotatable unit 10 has an extension in the radial direction extending from the hub 12 towards the rotatable unit body 14 (indicated as a dashed arrow with the letter R in FIG. 1). The rotatable unit body 14 is formed as an open cylinder 14 having an extension in the radial direction R. An outer wall 16 of the rotatable unit body 14 is facing away from the hub 12.

In FIG. 1, the moulds 20 are arranged to rotate in rotational direction D, with the rotatable unit 10, as each mould 20 is comprised in the rotatable unit 10 by being arranged in the rotatable unit body 14. Each mould 20 comprises a bottom 22, lateral walls 24 and a groove 26 arranged to receive a stick 52 from the stick providing arrangement 50. In other words, each mould 20 is arranged as an indention 20 in the outer wall 16 of the rotatable unit body 14. Each groove comprises two sidewalls and a bottom.

Each of the ejection mechanism 30 is associated with a mould 20, and comprises a piston 32. In FIG. 1, the pistons 32 (of which only some are indicated in FIG. 1) are arranged as the arms of a wheel in relation to the rotatable unit 10. Hence, the ejection mechanism 30 and its pistons 32 are rotatable with the rotatable unit 10. The pistons 32 are arranged to move radially inwards and radially outwards, preferably by being reciprocal pistons. Hence, by arranging each piston 32 to the bottom 22 of the moulds 20, and by providing a bottom 22 of the mould 20 which is movable, the bottom 22 of each mould 20 may move together with each associated piston 32 inside the rotatable unit body 14. As an alternative, the piston 32 may be arranged to move through the bottom 22 of the moulds 20.

The extrusion nozzle 40 is arranged to receive ice cream through a receiving portion 42, and extrude ice cream into the moulds 20. A sealing 44 is arranged to seal the extrusion nozzle 40 to the rotatable unit 10.

It should be noted that the rotatable unit 10 need not to be comprised by a single unit, but may comprise different parts and portions, such as e.g. the hub 12, the ejection mechanism 30 and the pistons 32 as being arranged as spokes of the rotatable unit 10, and the body 14 and outer wall 16 of the rotatable unit 10.

Figure 2:
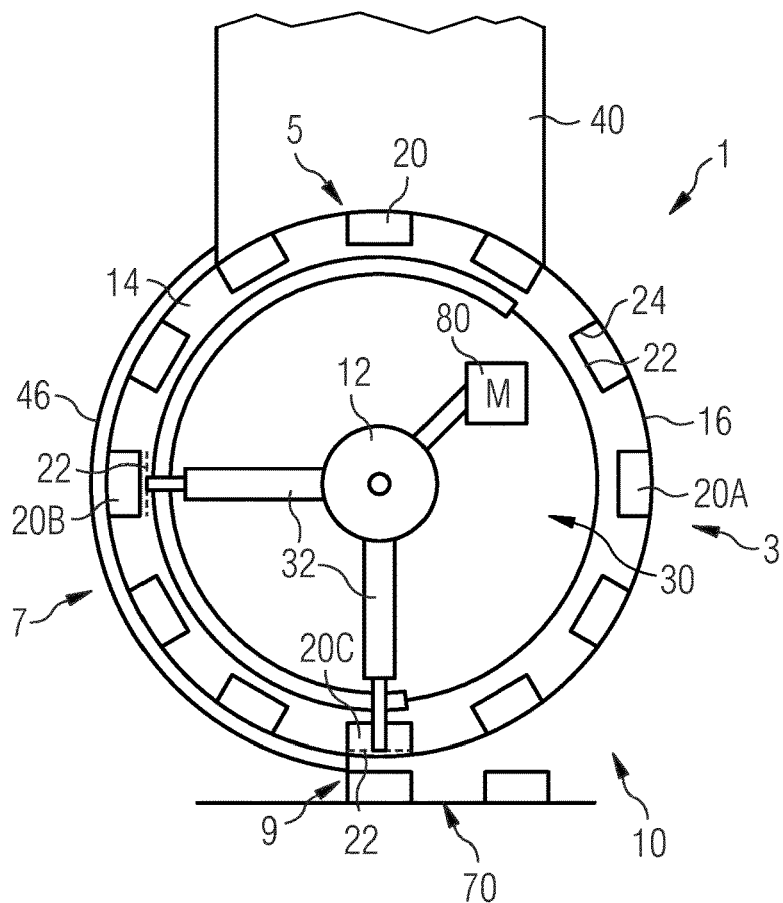
FIG. 2 illustrates in cross section, an ice cream machine according to an embodiment of the invention.

The general function of the ice cream machine 1 will now be described in further detail with respect to FIGS. 1 and 2. For illustrative purposes in FIG. 2, the stick providing arrangement 50 and the guiding structure 80 has been dispensed with. The stick providing arrangement 50 the guiding structure 80 will be further described and elucidated in connection with FIGS. 4-7. Furthermore, and for the same reasons, only two pistons 32 are shown in FIG. 2, and only some of the moulds 20 are indicated.

The ice cream machine 1 comprises a stick providing zone 3, a filling zone 5, a transportation zone 7, an emptying zone 9. The rotatable unit 10 and the moulds 20 are arranged to rotate between these zones 3, 5, 7, 9. In FIGS. 1 and 2, the moulds are arranged 20 rotate in a clockwise direction (the direction of rotation is perpendicular to the radial direction R of the rotatable unit 10 and is indicated by the curved arrow D).

The stick providing arrangement 50 (shown in FIGS. 1, 4 and 5) is arranged in the stick providing zone 3, prior to the filling zone 5, and is arranged to provide each mould 20 with a stick 52, as the moulds 20 are rotated passed the stick providing arrangement 50. In other words, the stick 52 is provided to the mould 20 prior to filling the mould 20 with ice cream. In FIG. 1, mould 20A has a groove 26, and the intended stick to be provided by the stick providing arrangement 50 is indicated by dashed lines. For illustrative purposes, stick 52 of mould 20B is shown. The stick providing arrangement 50 is configured to provide the stick 52 perpendicular to the rotational axis of the rotatable unit 10. The longitudinal direction of the stick 52 is also arranged parallel to the rotational axis of the rotatable unit 10.

The ice cream machine also comprises a guiding structure 80, shown in FIGS. 4-7, which is arranged to prevent more than one stick at a time from entering the groove 26 of the mould from the stick providing arrangement 50.

The stick providing arrangement 50 and the guiding structure 80 are stationary with respect to the rotatable unit. The stick providing arrangement 50 is arranged such that upon rotation of the rotatable unit 10, a groove 26 matches the position of the stick providing arrangement 50, and thereby a stick falls into the groove 26, preferably due to the force of gravity. Alternatively, a spring-loaded mechanism or the like can be used to augment or replace the force of gravity. Further rotation of the rotatable unit 10 causes one of the sidewalls of the groove 26 to bring the stick along the rotational movement towards the extrusion nozzle.

In the filling zone 5, the extrusion nozzle 40 extrudes ice cream into the mould 20, or moulds 20, positioned in fluid contact with the extrusion nozzle 40. Preferably, the extrusion nozzle 40 is arranged to be in fluid contact with more than one mould 20 at the same time, i.e. preferably the extrusion nozzle 40 is arranged to fill more than one mould 20 with ice cream at the same time. Hereby, the filling of the moulds 20 can be carried out more efficiently possibly without interruption of the rotation of the rotatable unit 10 during the process. Furthermore, the rotational speed of the rotatable unit 10 and the moulds 20 can be set higher.

The filling of the moulds 20 with ice cream by the extrusion nozzle 40 is preferably carried out with an increased pressure as compared to the surroundings (i.e. an overpressure). Hereby, the filling of the ice cream can be carried out in an efficient manner, and the ice cream, with our without inclusions can efficiently be arranged around the stick 52 in the mould 20.

It should be noted that in FIG. 1, only the filling zone 5 is illustrated as being covered by a cover 46 for illustrative purposes. However, according to one example embodiment, the moulds 20 are covered by the cover 46 in the filling zone 5 and in the transportation zone 7 (i.e. from the filling zone 5 up to the emptying zone 9) and are hence separated from the surroundings by the cover 46, as illustrated in FIG. 2.

Subsequently, the moulds 20 enter the transportation zone 7 as they continue to rotate with the rotatable unit 10 towards the emptying zone 9. In the transportation zone 7, the ejection mechanism 30 associated with each mould 20 is arranged to move radially inwards towards the hub 12. This is illustrated by that the bottom 22 of mould 20B in FIG. 2, represented by a dashed line, is withdrawn further towards the hub 12 compared to e.g. the bottom 22 of mould 20A. Hereby, the bottom 22 of each mould 20 in the transportation zone 7 can be moved towards the hub 12, i.e. radially inwards, whereby the overpressure in the moulds 20 (stemming from filling the moulds 20 with ice cream) can be decreased or even eliminated. Hereby, the risk of deformation of the ice cream product during ejection of the ice cream product from the mould 20, and/or mispositioning of the stick 52 in the ice cream product, can be reduced.

After the transportation zone 7, the moulds enter the emptying zone 9, where the ice cream, or ice cream product, is intended to be detached from its mould 20, and put on e.g. a conveyer tray 70 or conveyer belt 70 (shown only in FIG. 2). In the emptying zone 9, the ejection mechanism 30 pushes the ice cream, or ice cream product out of the respective mould 20. As illustrated in FIGS. 1 and 2, each piston 32 is movable radially outwards and is able to push the bottom 22 of each mould 20 radially outwards whereby the ice cream or ice cream product is ejected out of its mould 20. This is illustrated by that the bottom 22 of mould 20C in FIG. 2, represented by a dashed line, is arranged further away from the hub 12 as compared to e.g. the bottom 22 of mould 20A. At this stage, the ice cream, or ice cream product, is typically attached to the bottom 22 of the mould 20, and as the bottom 22 of the mould 20 has been pushed out of the rotatable unit body 14 of the rotatable unit 10, there are no longer any lateral sides 24 of the mould 20, and the bottom 22 of the mould 20 is substantially a part of the outer wall 16 of the rotatable unit body 14.

At the emptying zone 9, a detaching mechanism 60 (shown only in FIG. 1) is arranged to detach the ice cream, or ice cream product, from the mould. In FIG. 1, the detaching mechanism is formed as a scrape 60 arranged to move in the direction of the indicated arrow along the bottom 22 of the mould 20C whereby the ice cream, or ice cream product, will detach from the mould 20C. The detaching mechanism may also be a wire, (heated or not heated), arranged in a fixed position under the rotatable unit 10. It should be noted that in FIG. 1, the pushed-out bottom 22 of the mould 20C is not shown, only the stick receiving portions 26 of the moulds 20 are shown. Other detaching mechanism can be used, such as e.g. a scrape, a wire, a pneumatic-driven system, an ultrasound cutting tool.

After detaching the ice cream, or ice cream products, from the moulds 20, a conveyer tray 70 or conveyer belt 70 is preferably used for further transportation of the ice cream, or ice cream products.

As illustrated in FIG. 2, the rotatable unit 10 may be driven by a motor 80. The motor 80 may e.g. be electrically driven and may be connected to the hub 12 of the rotatable unit 10.

Figure 3:
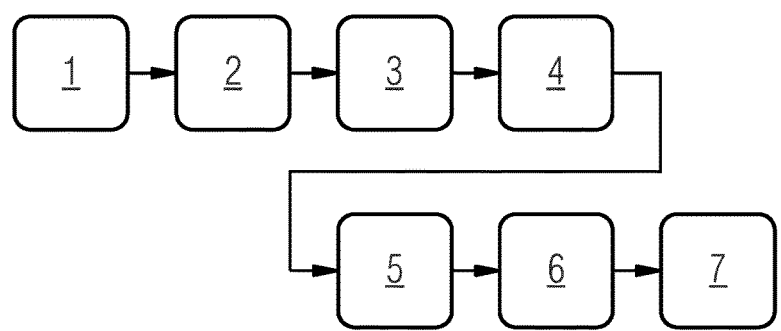
FIG. 3 is a flow-chart schematically illustrating at least one example embodiment of the invention.

The flow-chart in FIG. 3 schematically illustrates a method for producing an ice cream product using an ice cream machine 1 as described with reference to FIGS. 1 and 2 (hence, the reference numerals of FIGS. 1 and 2 are used below when describing the steps of the method in the flow-chart in FIG. 3).

In a first step 1, ice cream, with or without inclusions, are provided to the extrusion nozzle 40.

In a subsequent step 2, the rotatable unit is rotated, such that the groove 26 matches the position of the stick providing arrangement 50. Thereby, a single stick enters the groove 26 as the guiding structure prevents further sticks from entering the groove 26.

In a subsequent step 3, the rotatable unit is rotated, thereby causing one of the sidewalls of the groove 26 to bring the ice cream stick 52 along the rotational movement towards the filling zone 5.

In a subsequent step 4, the ice cream is extruded through the extrusion nozzle 40 into the mould 20 to form an ice cream lolly, in the filling zone 5. Preferably, and in the embodiments of the invention comprising more than one mould 20, more than one mould 20 is filled at the same time.

In a subsequent step 5, the ejection mechanism 30 associated with the mould 20 is moved radially outwards in order to eject the ice cream, or ice cream product from the mould 20.

In a subsequent step 6, the detaching mechanism 60 detaches the ice cream, or ice cream product, from the bottom 22 of the mould 20.

In a subsequent step 7, the ice cream, or ice cream product, is put on a conveyer tray 70 or conveyer belt 70 for further transportation.

Figure 4:
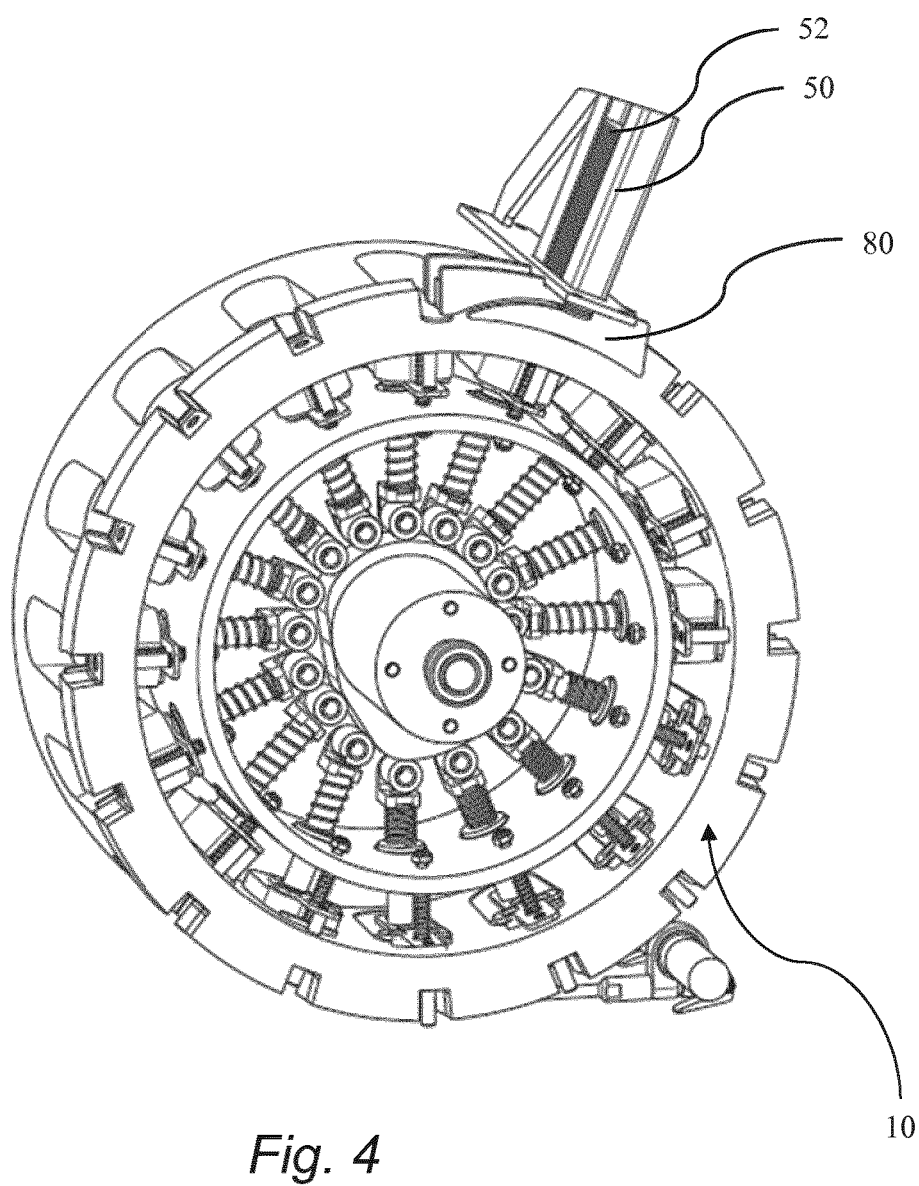
FIG. 4 is a perspective view of parts of an ice cream machine according to an embodiment of the invention.

FIG. 4 shows a perspective view of the rotatable unit 10, the stick providing arrangement 50 and the guiding structure 80 according to an embodiment of the invention.

The stick providing arrangement 50 is shaped as a magazine having a plurality of sticks 52 loaded therein. The sticks 52 are supplied to the groove 26 of the mould perpendicular to the rotational axis of the rotatable unit 10, and the longitudinal direction of the stick 52 is arranged parallel to the rotational axis of the rotatable unit 10. The guiding structure 80 is arranged to prevent more than one stick 52 at a time from entering the groove 26 of the mould from the stick providing arrangement 50. The guiding structure 80 therefore comprises a slit 82, see FIG. 6, sloping radially inwards in the rotational direction of the rotatable unit 10 such that a stick 52 reaches the bottom of the groove 26 during further rotation of the mould in question from the stick loading zone. The configuration of the guiding structure will now be explained with reference to FIGS. 5 to 7.

Figure 5:
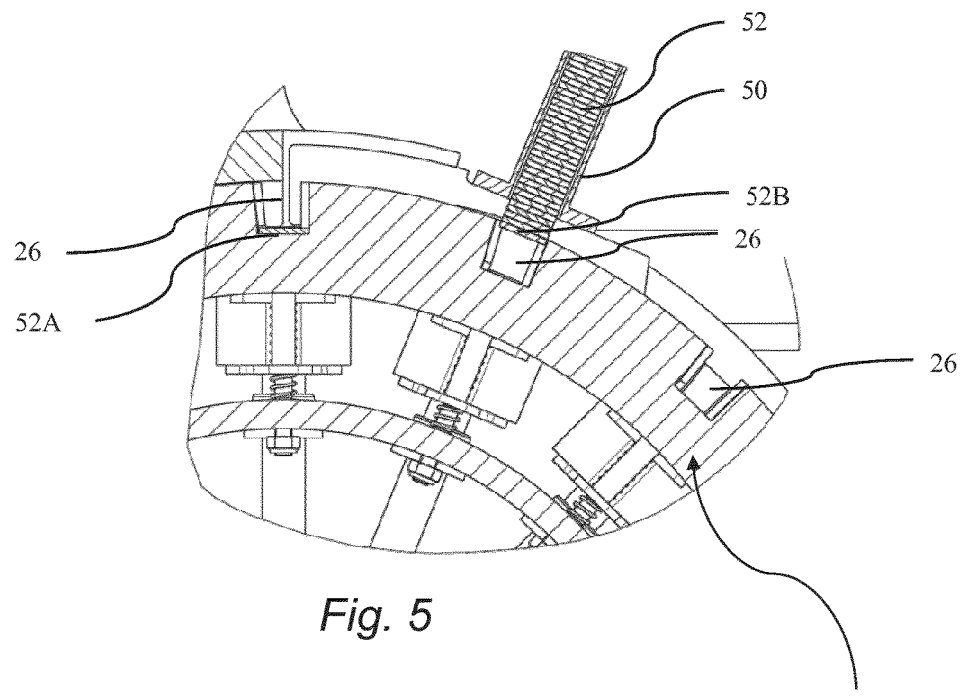
FIG. 5 is a detailed cross-sectional view the rotatable unit and stick providing arrangement according to an embodiment of the invention.
Figure 6:
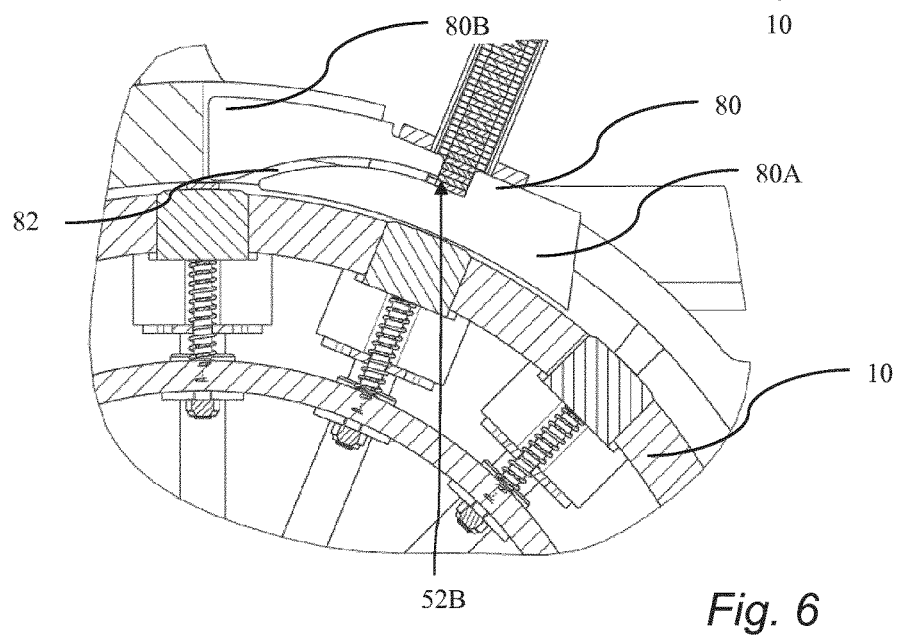
FIG. 6 is a detailed cross-sectional view the rotatable unit, stick providing arrangement and guiding structure according to an embodiment of the invention.
Figure 7:
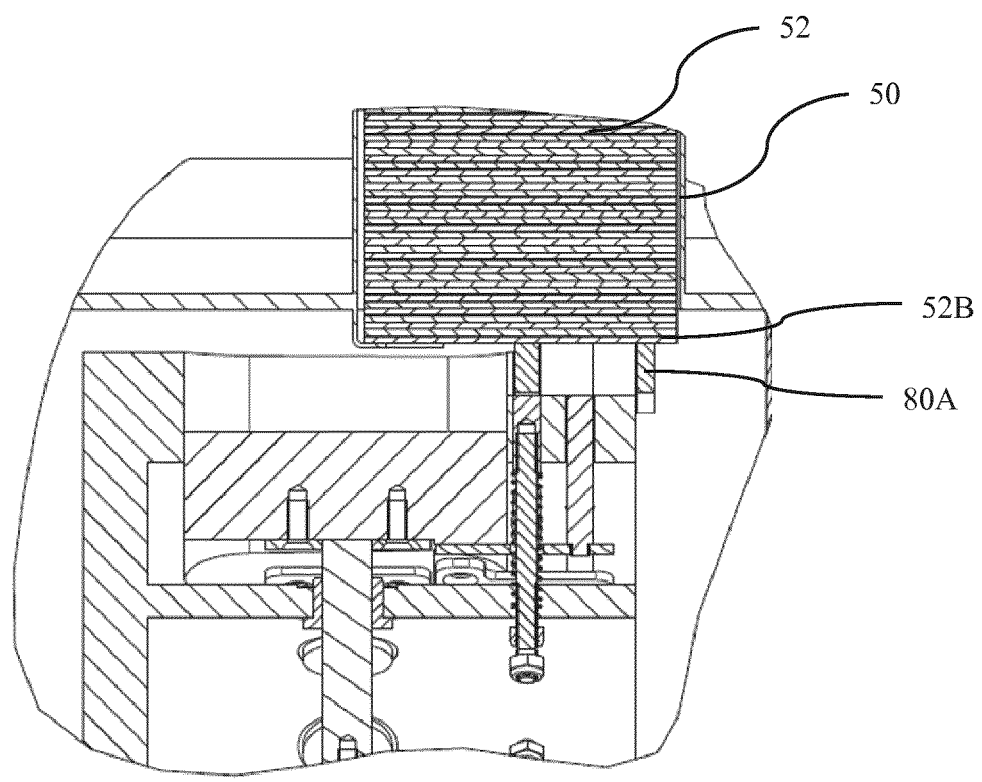
FIG. 7 is a detailed cross-sectional view the rotatable unit, stick providing arrangement and guiding structure according to an embodiment of the invention.

FIGS. 5, 6 and 7 are a detailed cross-sectional view of the rotatable unit 10, the stick providing arrangement 50 and the guiding structure 80, perpendicular to the rotational axis of the rotatable unit.

As seen in FIG. 5, the groove 26 to the left, i.e. along the rotational direction, has received a stick 52A in the bottom of the groove 26. The middle groove 26 is positioned below the stick providing arrangement 50 and a stick 52B is positioned at the top of the groove 26. In other words, the position of the groove 26 matches the position of the stick providing arrangement 50 to enable a single stick 52 to enter the groove. This stick 52B is also indicated in FIGS. 6 and 7. The stick 52B rests on the guiding structure 80 at the top of the groove 26, and will be transported towards the bottom of the groove 26, to reach the same position as the stick 52A, as the rotatable unit 10 rotates.

Turning to FIG. 6, the guiding structure comprises a first part 80A and a second part 80B. The first part 80A and the second part 80B are spaced apart to provide a slit 82, through which the stick 52B can be transported. Hence, the width of the slit 82 is slightly larger than the thickness of the sticks 52. The slit 82 slopes radially inwards in the rotational direction of the rotatable unit 10. At the end, towards the rotational direction, of the slit 82 the height of the slit 82, measured in the radial direction, matches the radial height of the of the groove 26.

In use, when the groove 26 is positioned under the stick providing arrangement 50, a stick 52 thus falls onto the first part 80A and is supported by the first part 80A as shown in FIG. 7. The stick 52B is then transported through the slit 82 by the sidewalls and the rotational motion of the rotatable unit 10.

As seen in FIG. 7, an end of the stick 52B (and also further sticks 52), protrudes from the groove 26 such that the stick 52B may be supported by the first part 80A. Stated differently, the stick providing arrangement 50 is positioned such that an end of the sticks 52 protrudes from the groove and may be supported by the guiding structure 80.

The skilled person realizes that a number of modifications of the embodiments described herein are possible without departing from the scope of the invention, which is defined in the appended claims.

For instance, the invention is not limited to the number of moulds, an ice cream machine having only a single mould is within the concept of the present invention. Furthermore, the moulds need no to be integrated into the rotatable unit, but may be arranged externally of the rotatable unit. The design of the rotatable unit may also be varied, e.g. by changing the geometrical shape of the unit. Furthermore, there may be more and/or other zones of the ice cream machine besides the filling zone, the transportation zone, the emptying zone and the stick providing zone described in this application. The more and/or other zones may be related to the same or other functions as those mentioned in this application.

The invention claimed is:

1. An ice cream machine having a filling zone and an emptying zone, the ice cream machine comprising:
    a rotatable unit having a radial extension and a rotational axis;
    a mould for receiving ice cream, the mould configured to rotate with the rotatable unit, the mould comprising a groove for receiving a stick, the groove comprising two sidewalls and a bottom;
    a stick providing arrangement configured to supply a stick to the groove of the mould, the stick providing arrangement configured to supply the stick in a direction perpendicular to the rotational axis of the rotatable unit, wherein a longitudinal direction of the stick is arranged parallel to the rotational axis of the rotatable unit;
    a guiding structure configured to prevent more than one stick at a time from entering the groove of the mould from the stick providing arrangement;
    wherein the stick providing arrangement is arranged such that upon rotation of the rotatable unit, the groove matches a position of the stick providing arrangement to enable a single stick to enter the groove;
    wherein the rotatable unit is configured such that further rotation of the rotatable unit causes one of the sidewalls of the groove to bring the stick along with a rotational movement of the rotatable unit; and
    wherein the guiding structure comprises a slit which is sloping radially inwards in a rotational direction of the rotatable unit such that the stick reaches the bottom of the groove.

2. The ice cream machine according to claim 1, wherein the stick providing arrangement is arranged to provide the stick in a final longitudinal direction, along the rotational axis, for the ice cream product to be produced.

3. The ice cream machine according to claim 1, wherein the stick providing arrangement and the guiding structure are arranged upstream of the filling zone of the ice cream machine.

4. The ice cream machine according to claim 1, wherein the stick providing arrangement is configured to hold a plurality of sticks stacked with a flat surface of the sticks facing each other and to supply a stick with the flat surface facing the rotational axis of the rotatable unit.

5. The ice cream machine according to claim 1, further comprising:
    an extrusion nozzle for extruding ice cream into the mould, wherein the extrusion nozzle is arranged at the filling zone; and
    an ejection mechanism for ejecting ice cream radially out of the mould at the emptying zone.

6. The ice cream machine according to claim 1, comprising at least five moulds.

7. The ice cream machine according to claim 2, wherein the stick providing arrangement and the guiding structure are arranged upstream of the filling zone of the ice cream machine.

8. A method for producing ice cream with a machine having an extrusion nozzle, an ejection mechanism, a rotatable unit, at least one mould configured to rotate with the rotatable unit, the mould comprising a groove for receiving a stick, the groove comprising two sidewalls and a bottom, a stick providing arrangement for supplying the stick having a longitudinal direction to the groove of the mould, the stick providing arrangement configured to supply the stick in a direction perpendicular to a rotational axis of the rotatable unit with the longitudinal direction of the stick parallel to the rotational axis of the rotatable unit, and a guiding structure configured to prevent more than one stick from entering the groove of the mould from the stick providing arrangement, the guiding structure comprising a slit which slopes radially inwards in a rotational direction of the rotatable unit such that the stick reaches the bottom of the groove, the method comprising the steps of:

providing ice cream with or without inclusions;

providing ice cream sticks in the stick providing arrangement;

rotating the rotatable unit, whereby the groove matches the position of the stick providing arrangement such that a single stick enters the groove;

rotating the rotatable unit such that one of the sidewalls of the groove brings the stick along a rotational movement towards the filling zone;

extruding the ice cream through the extrusion nozzle into the mould to form an ice cream lolly; and ejecting the ice cream lolly out of the mould using the ejection mechanism.

\* \* \* \* \*